United States Patent
Baboeuf et al.

(10) Patent No.: US 7,584,615 B2
(45) Date of Patent: Sep. 8, 2009

(54) METHOD OF IMPROVING THE IGNITION PERFORMANCE OF AN AFTER-BURNER DEVICE FOR A BYPASS TURBOJET, AND AN AFTER-BURNER DEVICE OF IMPROVED IGNITION PERFORMANCE

(75) Inventors: Sébastien Baboeuf, Avon (FR); Sabine Charpenel, Brunoy (FR); Eric Maingre, Brinville (FR); Alain Page, Montgeron (FR); Jacques Roche, Lisses (FR)

(73) Assignee: SNECMA, Paris (FR)

( * ) Notice: Subject to any disclaimer, the term of this patent is extended or adjusted under 35 U.S.C. 154(b) by 567 days.

(21) Appl. No.: 11/063,741

(22) Filed: Feb. 24, 2005

(65) Prior Publication Data

US 2005/0257527 A1    Nov. 24, 2005

(30) Foreign Application Priority Data

Feb. 24, 2004  (FR)  .................................. 04 01813

(51) Int. Cl.
*F02K 3/105* (2006.01)
*F02K 3/10* (2006.01)
*F02C 1/00* (2006.01)

(52) U.S. Cl. ............................. 60/762; 60/772; 60/761; 60/765

(58) Field of Classification Search .................. 60/204, 60/262, 226, 761–766, 772, 749
See application file for complete search history.

(56) References Cited

U.S. PATENT DOCUMENTS

| 3,528,250 | A | | 9/1970 | Johnson |
| 3,750,402 | A | | 8/1973 | Vdoviak et al. |
| 3,974,646 | A | | 8/1976 | Markowski et al. |
| 5,117,628 | A | | 6/1992 | Koshoffer |
| 5,400,589 | A | * | 3/1995 | Mahias et al. .................. 60/762 |
| 7,093,442 | B2 | * | 8/2006 | Lovett .......................... 60/761 |

* cited by examiner

*Primary Examiner*—William H Rodríguez
*Assistant Examiner*—Gerald L Sung
(74) *Attorney, Agent, or Firm*—Rothwell, Figg, Ernst & Manbeck, PC

(57) ABSTRACT

The after-burner device receives a "hot" central primary flow from the turbine of the turbojet and a "cold" peripheral secondary flow, and it has an after-burner ignition zone situated in the secondary flow that reaches the after-burner device. A fraction of the primary flow is brought into the after-burner ignition zone in order to raise the temperature in said zone to a value that is higher than that of the secondary flow so as to encourage after-burner ignition.

18 Claims, 3 Drawing Sheets

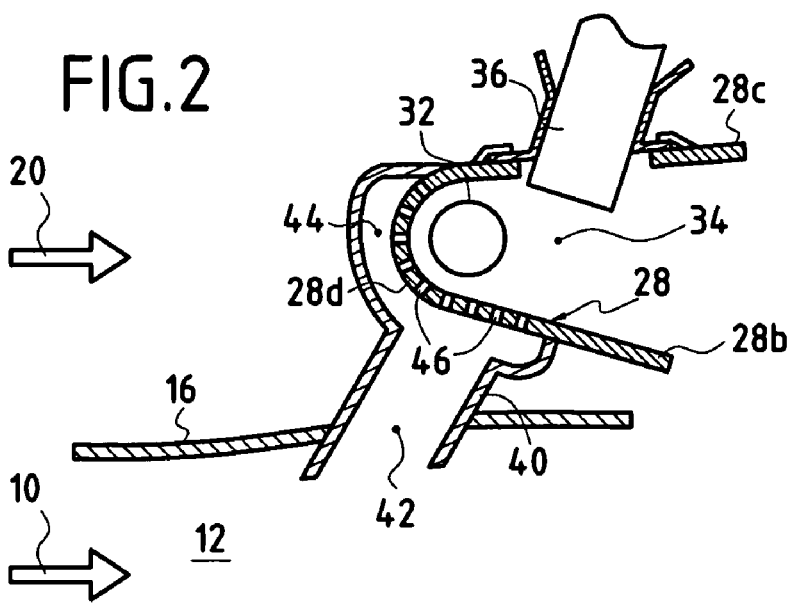
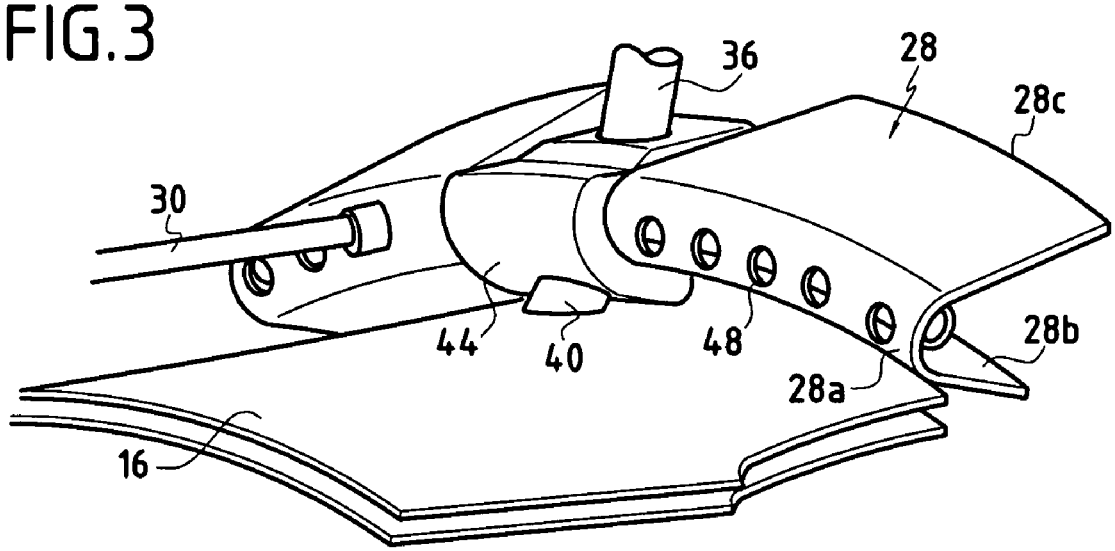

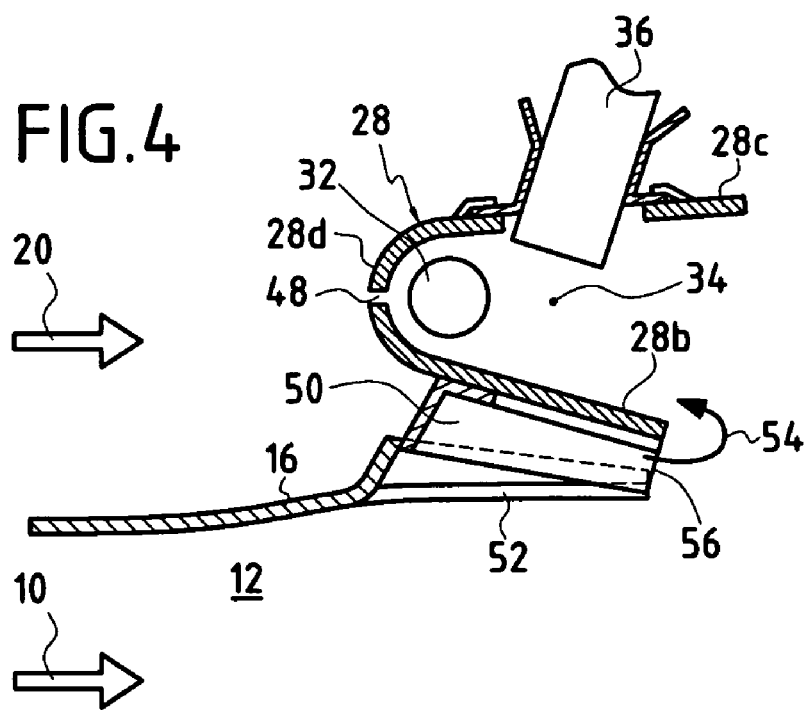
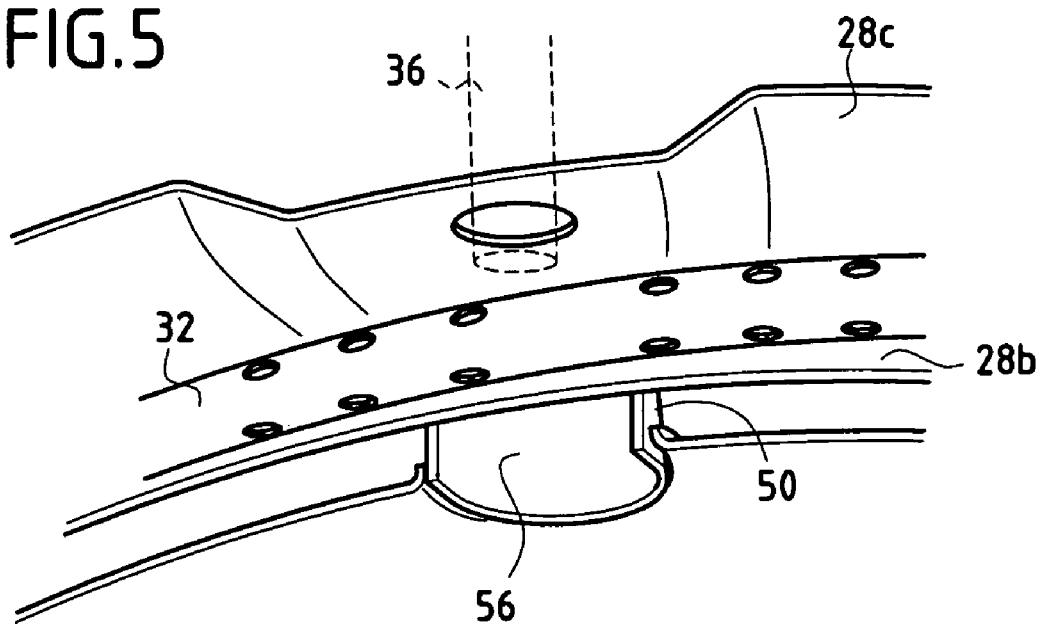

METHOD OF IMPROVING THE IGNITION PERFORMANCE OF AN AFTER-BURNER DEVICE FOR A BYPASS TURBOJET, AND AN AFTER-BURNER DEVICE OF IMPROVED IGNITION PERFORMANCE

A method of improving the ignition performance of an after-burner device for a bypass turbojet, and an after-burner device of improved ignition performance.

BACKGROUND OF THE INVENTION

The invention relates to after-burner devices for bypass turbojets, and more particularly it relates to improving the ignition performance of such devices.

Bypass turbojets for military airplanes are commonly fitted with an after-burner device. The after-burner device comprises an after-burner channel that receives from the turbojet both a "hot" central primary flow and a "cold" peripheral secondary flow, and that is connected at its outlet to a nozzle. The primary and secondary flows are obtained by splitting the total flow entering the turbojet into two flows. The primary flow passes through the high pressure compressor, the combustion chamber, and the high pressure and low pressure turbines of the turbojet, and reaches the after-burner device downstream from the low pressure turbine. The secondary flow flows at the periphery of the turbojet and it is used in particular for cooling certain members. The after-burner device further comprises means for injecting fuel into the vicinity of flame-holder members and an ignitor member, generally a spark plug, situated in an after-burner ignition zone. During after-burning, additional fuel is injected and is burnt by the oxygen contained in the two flows. This results in an increase in thrust.

It must be possible for the pilot to be able to ignite the after-burner device during any stage of flight and very quickly. Unfortunately, under certain flying conditions where the pressure generating the flow entering into the turbojet is low, and where consequently the pressure in the after-burner device is low, ignition performance can be insufficient. This is not compatible with the operational requirements of the airplane.

OBJECTS AND SUMMARY OF THE INVENTION

Thus, an object of the invention is to enable ignition performance to be improved so as to guarantee ignition even under unfavorable conditions, in particular when the pressure in the after-burner ignition zone is low.

In one aspect of the invention, this object is achieved by a method of improving the ignition performance of an after-burner device for a bypass turbojet, the after-burner device receiving a "hot" central primary flow coming from the turbine of the turbojet, and a "cold" peripheral secondary flow, and having an after-burner ignition zone situated in the secondary flow reaching the after-burner device, wherein a fraction of the primary flow is taken and brought locally into the after-burner ignition zone in order to raise the temperature in this zone to a value that is higher than the temperature of the secondary flow so as to encourage after-burner ignition.

Heating the after-burner ignition zone situated where the secondary flow arrives by diverting a fraction of the primary flow provides a simple and effective solution to the problem of improving ignition performance for the following reasons.

For given shape, ignition performance is closely related to the aerodynamic characteristics of the flow in the ignition zone, to the spray characteristics of the fuel injected into the ignition zone (and thus the characteristics of the mixture of air and fuel vapor), and to the energy delivered by the ignitor member.

One technique for providing improvement thus lies in modifying the aerodynamic characteristics of the flow, which characteristics depend on the speed of the flow, on the pressure of the mixture of air and fuel vapor, and on the temperature of said mixture.

If the speed of the flow surrounding the ignition zone decreases, then the transit time of the fuel mixture increases, thereby improving ignition performance. However, ignition generally takes place in a zone of turbulent backflow behind a flame catcher. In this zone where the flow speed is slower than in the remainder of the flow, it is difficult to know exactly the speed and the turbulence of the flow without performing calculations that are extremely complex and expensive. In addition, unsteady phenomena can occur therein. Furthermore, the after-burner ignition sequence includes sudden opening of the nozzle which is accompanied by a transient change in the thermodynamic conditions of the turbojet, thereby having an effect on the flow behind the flame catcher member. It is therefore particularly difficult in practice to achieve effective control of the local speed of flow in the ignition zone.

An increase in the pressure of the fuel mixture has a positive effect on ignition performance. Nevertheless, the pressure in the ignition zone depends directly on the low pressure compressor and cannot be increased beyond the limit that needs to be complied with in order to conserve a minimum margin for compressor pumping. In addition, since the pressures of the primary and secondary flows reaching the after-burner device are substantially the same, there is no source of high pressure available beside the primary flow.

Increasing the temperature of the fuel mixture also has a positive effect on ignition performance. However, contrary to that which is mentioned above concerning pressure, two sources of very different temperatures are available at the inlet of the after-burner device. The ignition zone can be situated where the hot primary flow arrives. However it is then necessary to cool the ignitor member, which requires special local architecture enabling the ignitor member to be ventilated by a fraction of the secondary flow without disturbing the aerodynamic characteristics in the ignition zone. By placing the ignition zone at the arrival of the secondary flow and by locally heating the ignition zone by bringing in a fraction of the primary flow, the method of the invention thus provides the following advantages:

an increase in ignition performance in all stages of flight by increasing the temperature of the fuel mixture;

the ignition function is kept in the secondary flow so there is no need to provide additional means for cooling the ignitor member, so its lifetime remains unaffected; and in those flying conditions where pressure is low, this pressure deficit is compensated, thus making it possible to reinstate ignition performance compatible with the operational requirements of the turbojet.

In an implementation of the method, a fraction of primary flow is injected into the upstream portion of the ignition zone. When ignition is performed in a zone bordered by a flame catcher ring, the fraction of primary flow may be injected into the ignition zone through orifices formed through the wall of the flame catcher ring.

In another implementation of the method, the ignition zone receives a fraction of the secondary flow in its upstream portion, and a fraction of the primary flow is brought into the downstream portion of the ignition zone and mixes with said fraction of the secondary flow in the ignition zone by backflow. When ignition is performed in a zone bordered by a circumferential flame catcher ring of substantially channel-section, the fraction of primary flow may be brought into the vicinity of an inner trailing edge of the flame catcher ring.

Preferably, the temperature of the secondary flow reaching the after-burner device is raised by at least 40° C.

In another aspect, the object of the invention is achieved by an after-burner device for a bypass turbojet having an after-burner channel disposed downstream from the turbojet in such a manner as to receive a "hot" central primary flow and a "cold" peripheral secondary flow coming from the turbojet on opposite sides of a confluence wall, fuel injector means, flame catcher members, and an ignitor member situated in an after-burner ignition zone in the secondary flow reaching the after-burner device, in which device, according to the invention, at least one feed duct is provided to bring a fraction of the primary flow into the ignition zone.

Advantageously, the feed duct has one end connected to the inner surface of the confluence wall around an opening formed through said wall, in order to collect said fraction of primary flow. When the flame catcher members comprise a flame catcher ring having a segment bordering the ignition zone, the second end of the feed duct is connected to the leading edge of said ring segment to communicate with an upstream portion of the ignition zone through orifices formed in said ring segment. In a variant, with a flame catcher ring of substantially channel-section, the second end of the feed duct opens out in the vicinity of an inner trailing edge of said ring segment in order to bring the secondary flow fraction into a downstream portion of the ignition zone.

BRIEF DESCRIPTION OF THE DRAWINGS

The invention will be better understood on reading the following description giving by way of non-limiting indication and with reference to the accompanying drawings, in which:

FIG. 2 is a fragmentary detail view on a larger scale of the ignition zone of the FIG. 1 after-burner device, modified to constitute a first embodiment of the invention;

FIG. 3 is a diagrammatic perspective view of the FIG. 2 detail seen from upstream;

FIG. 4 is a fragmentary detail view on a larger scale of the ignition zone of the FIG. 1 after-burner device modified to constitute a second embodiment of the invention; and FIG. 5 is a diagrammatic perspective view of the FIG. 4 detail seen from downstream.

DETAILED DESCRIPTION OF EMBODIMENTS OF THE INVENTION

Figure 1:
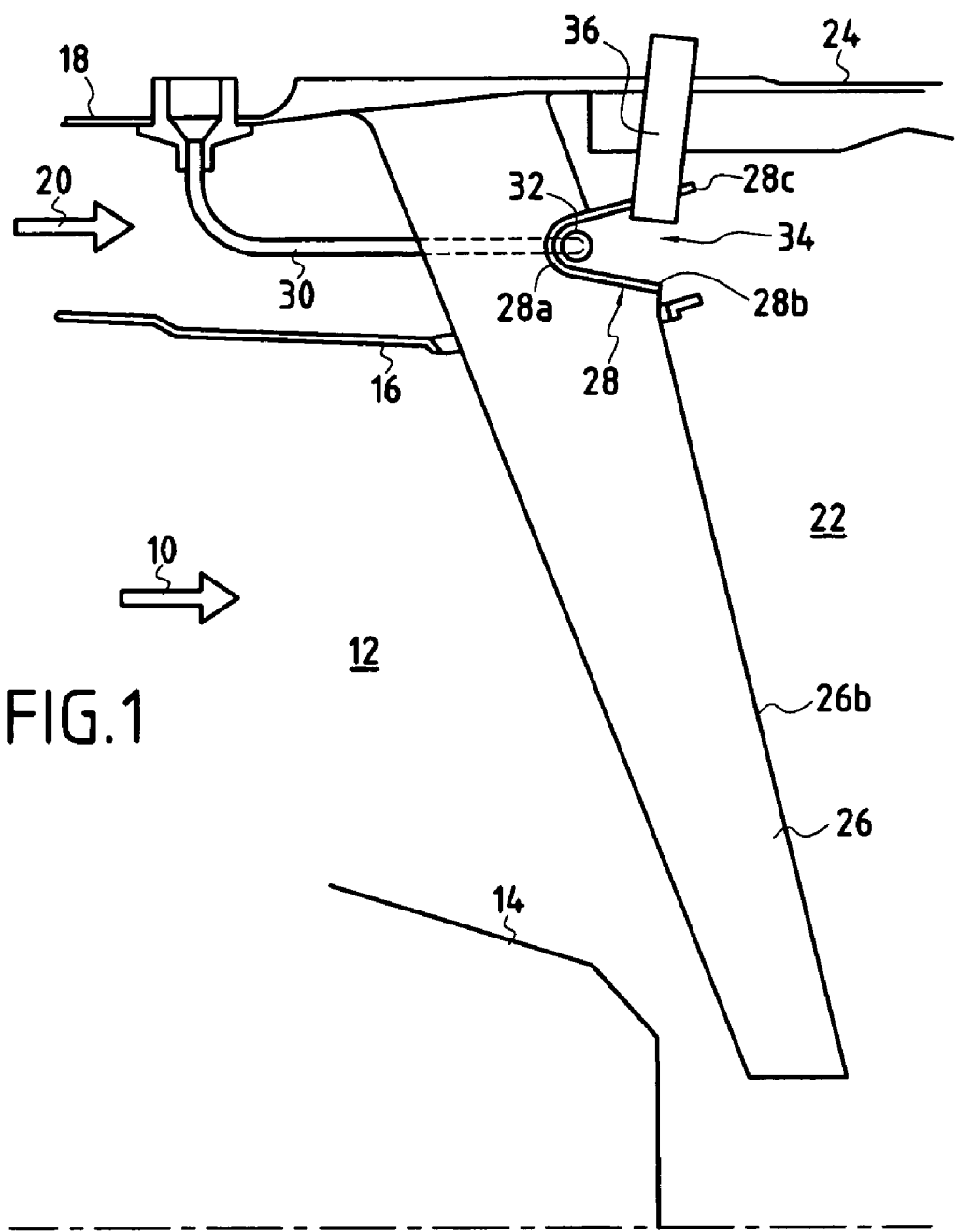
FIG. 1 is a highly diagrammatic fragmentary longitudinal half-section of the downstream portion of a turbojet fitted with an after-burner device.

Reference is made initially to FIG. 1 which shows a portion of the ignition zone of an after-burner device for a bypass turbojet.

As is well known per se, in a bypass turbojet, the air flow entering into the turbojet and compressed by a fan is split into an axial primary flow and a peripheral secondary flow, both of which flow in the axial direction.

The primary flow passes through a high pressure compressor, feeds the combustion chamber of the turbojet, and then passes through a high pressure turbine and a low pressure turbine.

The secondary flow follows a peripheral path and is used in particular for cooling members of the turbojet.

Downstream from the low pressure turbine (where the terms "upstream" and "downstream" are used herein with reference to the flow direction of the flows through the turbojet), the "hot" primary flow 10 reaches an exhaust enclosure 12 defined on the inside by an exhaust cone 14 and an on the outside by a confluence wall 16.

The "cold" secondary flow 20 flows in a space situated between the confluence wall 16 and an outer wall 18.

The primary and secondary flows 10 and 20 coming from the turbojet are admitted into and mixed in an after-burner device comprising an after-burner channel 22 defined by an outer wall 24 and connected to the exhaust enclosure 12.

The after-burner device includes flame catcher members formed by radial arms 26 fixed to the outer wall 18 and by a ring 28 supported by the arms 26, via their trailing edges 26b.

The flame catcher ring 28 is substantially of channel-section with its web 28a constituting the leading edge, and it is extended by inner and outer flanges 28b and 28c.

A duct 30 situated in the secondary flow serves to feed a circular manifold 32 received inside the flame catcher ring 28.

After-burner is ignited in an ignition zone 34 which is bordered by a segment of the flame catcher ring 28 and where an ignitor member or spark plug 36 is located. The spark plug 36 has one end passing through the outer flange 28c of the ring 28 in order to produce a spark in the ignition zone 34 situated in a backflow zone behind the ring 28.

The ignition zone 34 is situated where the secondary flow 20 enters into the after-burner device, the ring 28 being carried by the arms 26 close to their outer ends, so that the spark plug 36 is for the most part swept by the secondary flow 20.

In accordance with the invention, means are provided for bringing a fraction of the "hot" primary flow into the ignition zone of the after-burner device. This fraction of the primary flow is taken from the exhaust enclosure 12, upstream from its end opening out into the after-burner channel 22, and it is brought locally and solely into the zone where the after-burner is ignited.

In a first embodiment (FIGS. 2 and 3), a duct 40 has a first end connected to the exhaust enclosure 12 via an opening 42 formed in the confluence wall 16 and a second end forming a chamber 44 for feeding the ignition zone 34 with a fraction of the primary flow. For this purpose, the duct 40 is connected to the outer wall of the flame catcher ring 28 along the segment 28d of the ring 28 that borders the ignition zone. The feed chamber 44 communicates with the upstream end of the ignition zone 34 through perforations 46 formed in the wall of the ring segments 28d.

A fraction of the secondary flow 20 comes from the inside of the flame catcher ring 28, passing through the orifices 48 formed in the leading edge 28a of the ring, away from the segment 28d.

In addition, a fraction of the secondary flow flowing along the outside surfaces of the flanges 28b and 28c of the ring can also feed the inside of the ring 28 by backflow past the trailing edges of the flanges 28b and 28c. By the backflow movements produced inside the ring 28, mixing occurs in the ignition zone 34 between the "hot" primary flow and the "cold" secondary flow. As a result, the temperature in the ignition zone is raised to a level that is intermediate between the temperatures of the primary flow and of the secondary flow.

Compared with a disposition in which ignition is implemented solely in the secondary flow, the rise in temperature obtained by feeding in primary flow enables ignition performance to be extended.

Compared with a disposition in which ignition is implemented solely in the primary flow, there is no longer any need to provide special means for cooling the ignitor member 36 in order to keep it unharmed and maintain its lifetime.

The quantity of primary flow 10 that is injected into the ignition zone is determined by the number and the size of the perforations 46. This quantity is advantageously selected in such a manner as to raise the temperature in the ignition zone, prior to the after-burner ignition, to a temperature that is higher than that of the secondary flow by at least 40° C., and preferably by at least 60° C.

It should be observed that the perforations 46 can be formed through the leading edge 28a and through the adjacent portions of the flanges 28b and 28c of the segment 28d of the ring 28, thereby generating turbulence that encourages mixing between air and fuel in the ignition zone.

In a second embodiment (FIGS. 4 and 5), a duct 50 has a first end connected to the exhaust enclosure 12 via an opening 52 formed through the confluence wall 16 and a second end opening downstream level with the inner flange 28b of the flame catcher ring, in the segment 28d thereof.

The fraction of primary flow taken by the duct 50 reaches the downstream portion of the ignition zone 34 by backflow around the trailing edge of the flange 28b (see arrow 58 in the FIG. 4).

The leading edge 28a of the flame catcher ring has orifices 48 over its entire length, possibly including in the segment 28d bordering the ignition zone 34, so that it is fed with a fraction of secondary air that becomes mixed with the primary air delivered by the duct 50.

As in the first embodiment, the quantity of primary air brought into the ignition zone is selected so as to raise its temperature to a value which exceeds the temperature of the secondary flow by at least 40° C., and preferably by at least 60° C.

The embodiments described above show that the abovementioned advantages of the invention are associated with low cost in terms of industrialization and manufacture, great reliability, zero maintenance costs, and negligible influence on the general aerodynamics of the after-burner device, in particular because of the simplicity of the means enabling a fraction of primary flow to be brought into the ignition zone.

What is claimed is:

1. A method of improving the ignition performance of an after-burner device for a bypass turbojet, the after-burner device receiving a "hot" central primary flow coming from an exhaust enclosure of the turbine of the turbojet, and a "cold" peripheral secondary flow flowing peripherally outside the exhaust enclosure, and having an after-burner ignition zone situated in the secondary flow reaching the after-burner device such that the ignition function is kept in the secondary flow, comprising:
   providing an ignitor member located in the ignition zone; and
   conveying a portion of the primary flow into the after-burner ignition zone through a feed duct connected at one end to a flame catcher ring that borders the ignition zone and connected at its other end to the exhaust enclosure in order to raise the temperature in this zone to a value that is higher than the temperature of the secondary flow so as to encourage after-burner ignition.

2. A method according to claim 1, wherein a fraction of primary flow is injected into the upstream portion of the ignition zone.

3. A method according to claim 2, in which ignition is performed in a zone bordered by a flame catcher ring, wherein the fraction of primary flow is injected into the ignition zone through orifices formed through a wall of the flame catcher ring.

4. A method according to claim 1, in which the ignition zone receives a fraction of the secondary flow in its upstream portion, and a fraction of the primary flow is brought into the downstream portion of the ignition zone and mixes with said fraction of the secondary flow in the ignition zone by backflow.

5. A method according to claim 4, in which ignition is performed in a zone bordered by a circumferential flameholder ring that is substantially of channel-section, wherein the fraction of primary flow is brought into the vicinity of an inner trailing edge of the flame catcher ring.

6. A method according to claim 1, wherein the temperature in the ignition zone is raised to a value that is at least 40° C. greater than the temperature of the secondary flow reaching the after-burner device in the ignition zone.

7. An after-burner device for a bypass turbojet having an after-burner channel disposed downstream from the turbojet in such a manner as to receive a "hot" central primary flow from a turbojet turbine through an exhaust enclosure defined at least in part by a confluence wall surrounding the exhaust enclosure and a "cold" peripheral secondary flow coming from the turbojet on opposite sides of the confluence wall, the device comprising:
   flame catcher members;
   a flame catcher ring connected to the flame catcher members and comprising two flanges connected at an apex and bordering an ignition zone, wherein the flame catcher ring and ignition zone are disposed with respect to the confluence wall so as to be located within the secondary flow entering the after-burner device;
   fuel injector means for injecting fuel into the ignition zone;
   an igniter member situated in said ignition zone in the secondary flow and adapted to ignite a fuel mixture in the ignition zone such that the ignition function is kept in the secondary flow; and
   at least one feed duct connected at one end to the flame catcher ring and connected at its other end to the exhaust enclosure and configured to convey a portion of the primary flow from the exhaust enclosure into the ignition zone.

8. A device according to claim 7, wherein the feed duct collects said portion of primary flow from around an opening formed through said confluence wall.

9. A device according to claim 7, wherein the feed duct has one end connected to the surface of said ring segment on its side opposite from that where the ignition zone is located in order to communicate with an upstream portion of the ignition zone through orifices formed in said ring segment.

10. A device according to claim 7, wherein the flame catcher ring is substantially of channel-section and has a segment bordering the ignition zone, wherein the end of the feed duct connected to the flame catcher ring opens out in the vicinity of an inner trailing edge of said ring segment.

11. A device according to claim 9, wherein said flame catcher ring includes a plurality of orifices formed along at least a portion of the leading edge thereof.

12. A device according to claim 10, wherein said flame catcher ring includes a plurality of orifices formed along at least a portion of the leading edge thereof.

13. An after-burner device for a bypass turbojet which generates primary exhaust flow and secondary bypass flow on opposite sides of a confluence wall of the turbojet and which includes an after-burner channel disposed downstream from the turbojet in such a manner as to receive the primary exhaust flow and the secondary bypass flow, said after-burner device comprising:

a flame catcher ring comprising two flanges connected at an apex and bordering an after-burner ignition zone disposed with respect to the confluence wall so as to be located within the secondary flow entering the after-burner channel;

a fuel injector operatively positioned with respect to the flame catcher ring to inject fuel downstream of a leading edge of the flame catcher ring, wherein the flame catcher ring is configured to allow the fuel injected by the fuel injector to mix with at least a portion of the secondary flow within said ignition zone at least partially bordered by the flame catcher ring;

at least one feed duct connected at one end to the flame catcher ring and connected at its other end to the confluence wall and constructed and arranged to convey a portion of the primary exhaust flow through the confluence wall and into the ignition zone, thereby forming a mixture including fuel, and gases from the primary flow and the secondary flow; and an ignitor operatively positioned with respect to the flame catcher ring and adapted to ignite the mixture within the ignition zone.

14. The after-burner device of claim 13, wherein the feed duct is configured to communicate with the ignition zone through orifices formed in the flame catcher ring.

15. The after-burner device of claim 13, wherein the feed duct is configured to communicate with the ignition zone through an outlet adjacent a trailing edge of the flame catcher ring to bring the portion of primary exhaust flow into a downstream portion of the ignition zone.

16. The after-burner device of claim 14, wherein said flame catcher ring includes a plurality of orifices formed along at least a portion of the leading edge thereof.

17. The after-burner device of claim 15, wherein said flame catcher ring includes a plurality of orifices formed along at least a portion of the leading edge thereof.

18. A method of improving the ignition performance of an after-burner device for a bypass turbojet receiving a "hot" central primary flow coming from a turbojet turbine through an exhaust enclosure and a "cold" peripheral secondary flow, said method comprising:

providing an after-burner ignition zone situated in the secondary flow reaching the after-burner device such that the ignition function is kept in the secondary flow;

providing an ignitor member in the ignition zone;

conveying a portion of said "hot" primary flow into the ignition zone through a feed duct connected at one end to a flame catcher ring that borders the ignition zone and connected at its other end to the exhaust enclosure, wherein said "hot" central primary flow portion is collected from the exhaust enclosure upstream from the exhaust enclosure's end opening out into an afterburner channel;

injecting fuel downstream of a leading edge of the flame catcher ring to form a mixture of fuel, "cold" secondary flow, and "hot" primary flow in the ignition zone; and igniting the mixture in the ignition zone.

\* \* \* \* \*